United States Patent

Callahan

[11] Patent Number: 5,577,619
[45] Date of Patent: Nov. 26, 1996

[54] STEEL COIL STORAGE RACK SYSTEM

[76] Inventor: Eugene J. Callahan, 9519 Marigold La., Munster, Ind. 46321

[21] Appl. No.: 270,042

[22] Filed: Jul. 1, 1994

[51] Int. Cl.$^6$ ............................................. A47F 7/00
[52] U.S. Cl. ........................ 211/13; 211/60.1; 410/49
[58] Field of Search ..................... 211/13, 59.4, 60.1; 248/146, 346, 216.1, 217.4; 410/49

[56] References Cited

U.S. PATENT DOCUMENTS

| | | |
|---|---|---|
| 1,739,423 | 12/1929 | Seeley . |
| 2,559,573 | 7/1951 | Unwin . |
| 2,598,068 | 5/1952 | Peyton . |
| 2,682,426 | 6/1954 | Staffe ........................................ 410/49 |
| 3,460,684 | 8/1969 | Almasy .................................... 410/49 |
| 3,829,148 | 8/1974 | Stoneburner . |
| 3,876,173 | 4/1975 | Cline . |
| 4,106,735 | 8/1978 | Partain et al. . |
| 4,315,707 | 2/1982 | Fernbach . |
| 4,503,978 | 3/1985 | Smit et al. ............................. 211/60.1 |
| 4,653,967 | 3/1987 | Isaksson et al. . |
| 5,113,976 | 5/1992 | Noakes . |

*Primary Examiner*—Robert W. Gibson, Jr.
*Attorney, Agent, or Firm*—Richard G. Kinney

[57] ABSTRACT

Rack forms to be placed on the ground or floor of a steel coil storage area and provided with 4×4 or similar timber units to form racks and a rack system for receiving steel coils and holding them off the floor or ground. The rack forms define a pair of spaced-apart channels or troughs into which lumber units are received. The channels include, as securing means, vertical nails or spikes pointing upward. The lumber is driven into the spike as it is received in the trough. Cross members secure the troughs together and define and fix the distance separating the parallel lumber units. A pair of such rack forms can produce a rack much longer than twice their length by providing them with long timber units spanning between the separated pair of rack forms. Parallel rack arrays can be made using a second T-rack form, using similar troughs and spikes to hold timber units in a T-array.

17 Claims, 3 Drawing Sheets

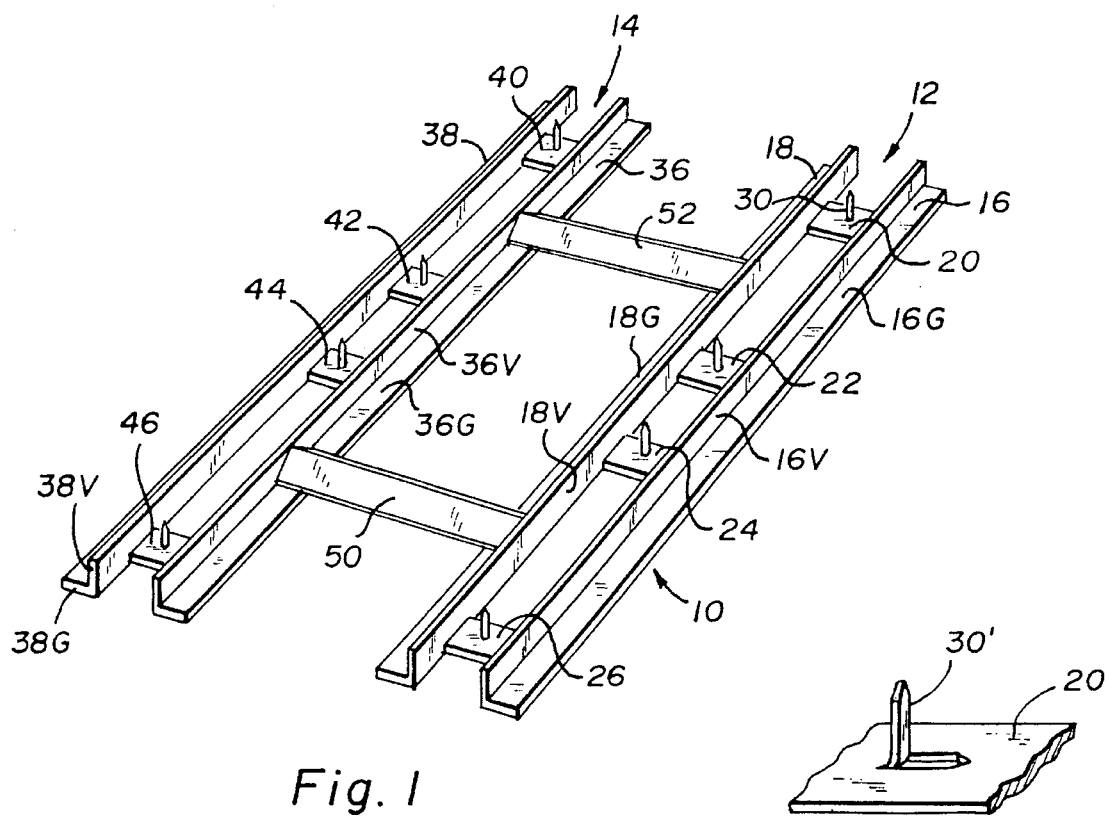
Fig. 1
Fig. 1A
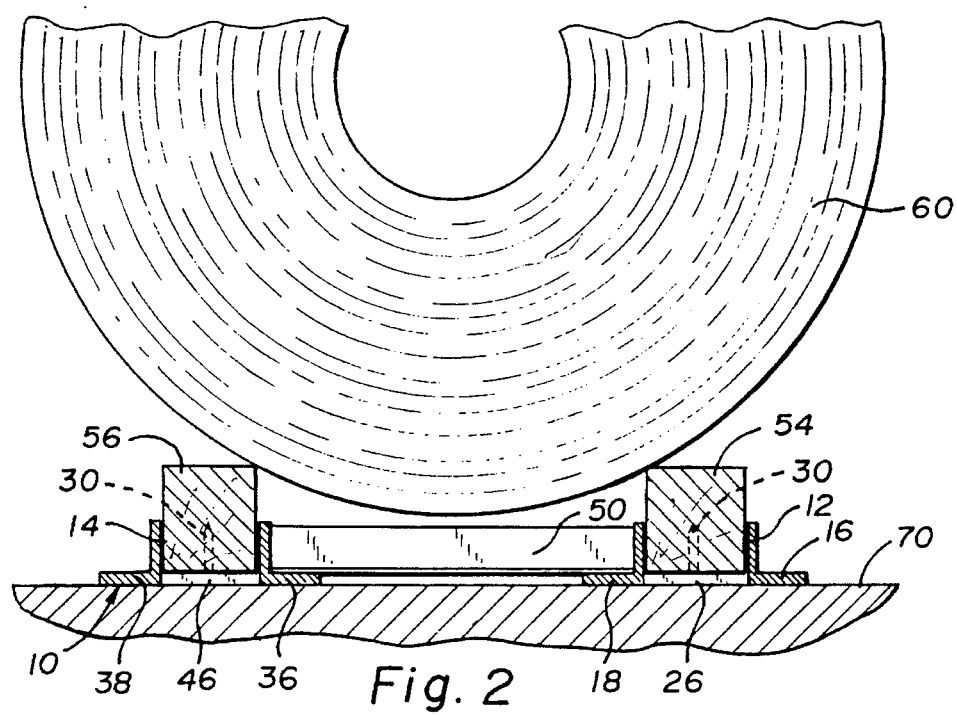
Fig. 2

STEEL COIL STORAGE RACK SYSTEM

FIELD OF THE INVENTION

The present invention relates to a new rack form and rack system for the storage of steel coils.

BACKGROUND OF THE INVENTION

Steel coils weighing between 15,000 and 30,000 pounds are commonly stored on a pair of 4×4s nailed or spiked into the ground or into the floor about 10–20 inches apart. This, if done right, keeps the coil from contacting the ground or floor. If the 4×4s are not spiked or not spiked well, the weight and force of a dropped coil (dropped by a "cowboy" fork lift operator) can spread the 4×4s and result in the coil contacting the (often concrete) floor or ground. This can lead to moisture reaching the coil and result in rusting of the coil.

While various other means have been suggested for preventing the spread of the timbers supporting a coil during the relatively short period when they are shipped or transported on a truck bed (examples of these are shown in U.S. Pat. Nos. 3,876,173 and 4,106,735), these suffer from certain drawbacks when used in long-term steel coil storage. That is, these racks often allow the coil to contact the surface between the timber and, when not properly loaded with a coil, they also restrain the 4×4s in only one horizontal direction and thus allow the 4×4s (when not carrying a coil) to slide and move about and, as a plurality of separate racks are needed in storage, the racks themselves can be easily knocked out of alignment and, if the loose 4×4s are struck by a coil being loaded on it, the 4×4s can easily jump out of the conventional rack entirely.

SUMMARY OF THE INVENTION

The present invention provides a rack form and rack system with at least a pair of timbers, such as 4×4s, for the long-term storage of steel coils without the coils contacting the ground or floor of the storage area.

The rack uses conventional lumber or timbers, such as 4×4s, and comprises at least two channels sized to receive the timbers, fixed cross member means secured to and between the channels so as to maintain them in a parallel array, and means in the channels for securing the timbers therein.

In accordance with one feature of the invention, these timber securing means are a plurality of vertical spikes on which the timbers are impaled when driven downward into the channel.

The invention includes a system of racks formed by employing a number of racks aligned with one another and bridged by timbers so as to allow a large number of coils to be stored with a relatively small number of racks.

Another feature of the invention is spacing racks comprising a T-arrangement of channels with timber and securing means in the base channel which are used to separate at a fixed distance (determined by a timber placed in the bases) parallel sets of racks so that two (or more) rows of steel coils may be stored adjacent each other.

The invention, together with further advantages and features thereof, may best be understood by reference to the following description, taken in connection with the accompanying drawings, in the several figures of which like reference numerals identify like elements.

BRIEF DESCRIPTION OF THE DRAWINGS

FIG. 1 is a perspective view of a rack form constructed in accordance with the principles of the present invention.

FIG. 1A is a perspective view of a spike constructed in accordance with the principles of the present invention.

FIG. 2 is an end view of the rack of FIG. 1 with timbers installed and a steel coil (shown broken away) stored on the timbers.

DETAILED DESCRIPTION OF THE PREFERRED EMBODIMENTS

Figure 3:
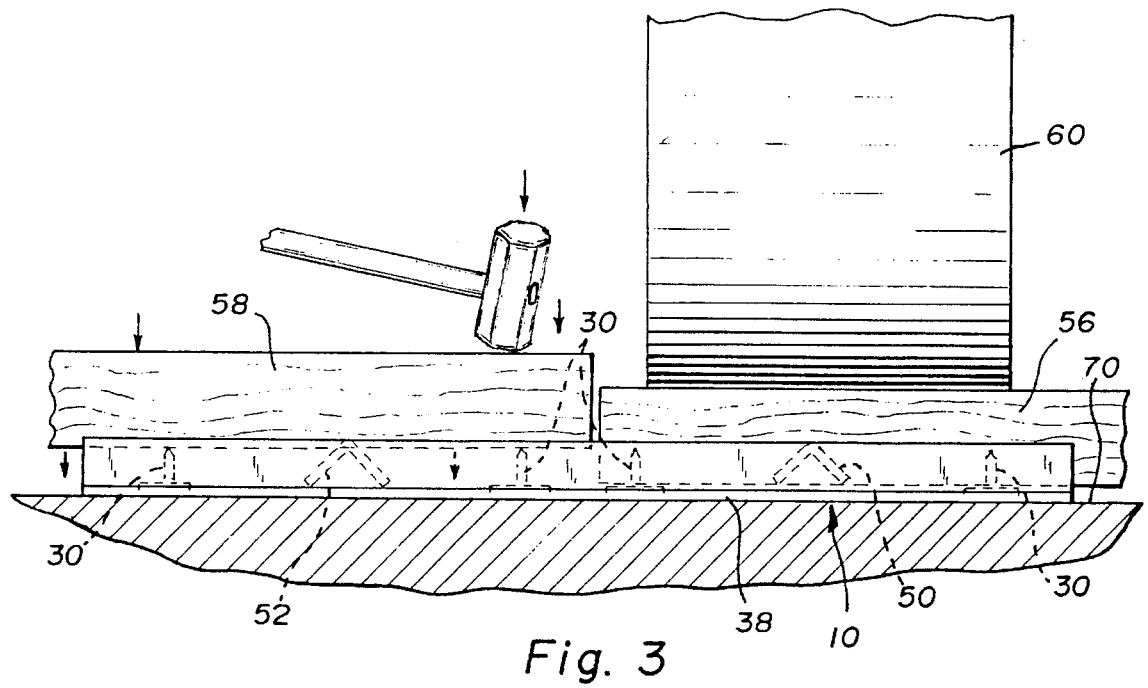
FIG. 3 is a side view of the rack of FIG. 2.

Referring to FIG. 1, there is depicted a rack form made in accordance with the present invention and generally designated by the number 10. The rack 10 consists of means defining a first channel or trough for receiving a timber such as a 4×4 (or 4×5 or 4×6) and similar means 14 for defining a second parallel channel or trough 12. That is, the trough 12 is defined by an angle 16 spaced from an angle 18 with one wall 16G, 18G of the angles being horizontal and forming the base of the rack form for resting on the ground or floor when in use and the other walls 16V and 18V being vertical and spaced-apart to receive in a loose fit the flat side of a standard timber unit (e.g., a 4×4). Bridging between the angles 16 and 18 are plates 20, 22, 24 and 26 which are welded at both ends to the angles 16 and 18 and be in the same plane as the walls 16G and 18G. As such, the plates 20–26 also serve as part of the base of the rack form 10.

In accordance with one feature of the present invention, the troughs 12 and 14 are provided with means for affixing the timber in place. This consists of a vertical spike or nail 30 at each cross plate. This spike or nail 30 may be a conventional nail spot-welded in place or, as shown in FIG. 1A, a spike 30' may be formed by stamping out of the plates.

The trough 14 is identically formed of angles 36, 38 having horizontal walls 36G and 38G and vertical walls 36V and 38V and bridging plates 40, 42, 44 and 46, each with a vertical spike 30. Between the two troughs are angles 50 and 52 which are welded at these areas of contact to the angles 18 and 36 to form a generally H shaped relatively rigid form.

As shown in FIG. 2, the troughs 12 and 14 are designed to receive standard timber units such as the timber units 54 and 56 which are impaled onto the spikes 30 to form a rack for receiving a steel coil 60 as shown. It should be noted in FIG. 2 that the coil makes contact only with the timbers 54, 56 and not with the ground or floor 70, nor with the metal of the form 10.

One preferred way of impaling the timbers onto the spikes 30 is illustrated in FIG. 3, wherein a timber is placed on the trough and on the spike 30 and pounded down by a sledge hammer or the like with blows being alternated between the areas above the spike, so as to keep the timber horizontal as it is driven downward.

As can also be appreciated from FIG. 3, two timbers such as timber 56 and timber 58 can be effectively joined end to end within a channel or trough with both secured to the trough. This allows the rack form 10 to be used with different lengths of timbers. It should also be noted that the timbers can extend beyond the rack form.

Figure 4:
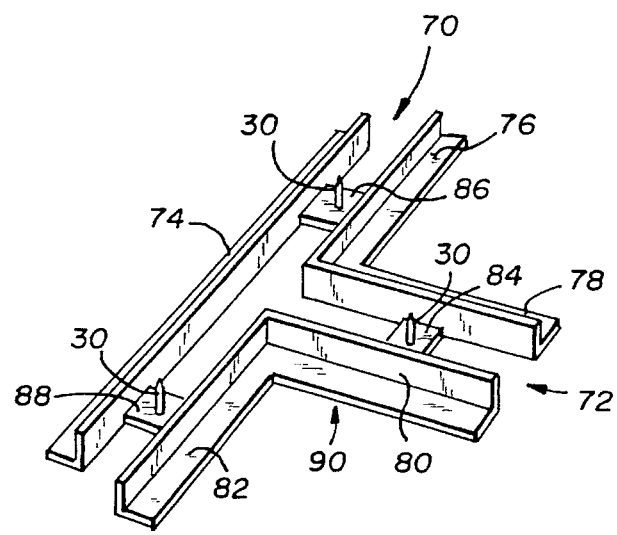
FIG. 4 is a second rack, also constructed in accordance with the principles of the present invention.

In FIG. 4, a second rack 90 that is also constructed in accordance with the present invention is depicted. This rack defines two troughs or channels 70 and 72, with the channel 72 being at a right angle to that of the channel 70. The channels are formed in a similar way as before, with angle 74 forming one side of the channel 70. A pair of angles 76 and 78 joined to form a right angle and a second pair of angles 80, 82 also joined to form a right angle. These are secured by a base plate 84 between angles 78 and 80 to define channel 72 and by base plates 86 and 88 to form the channel 70. Each of the plates 84, 86 and 99 are provided with a vertical spike 30.

Figure 5:
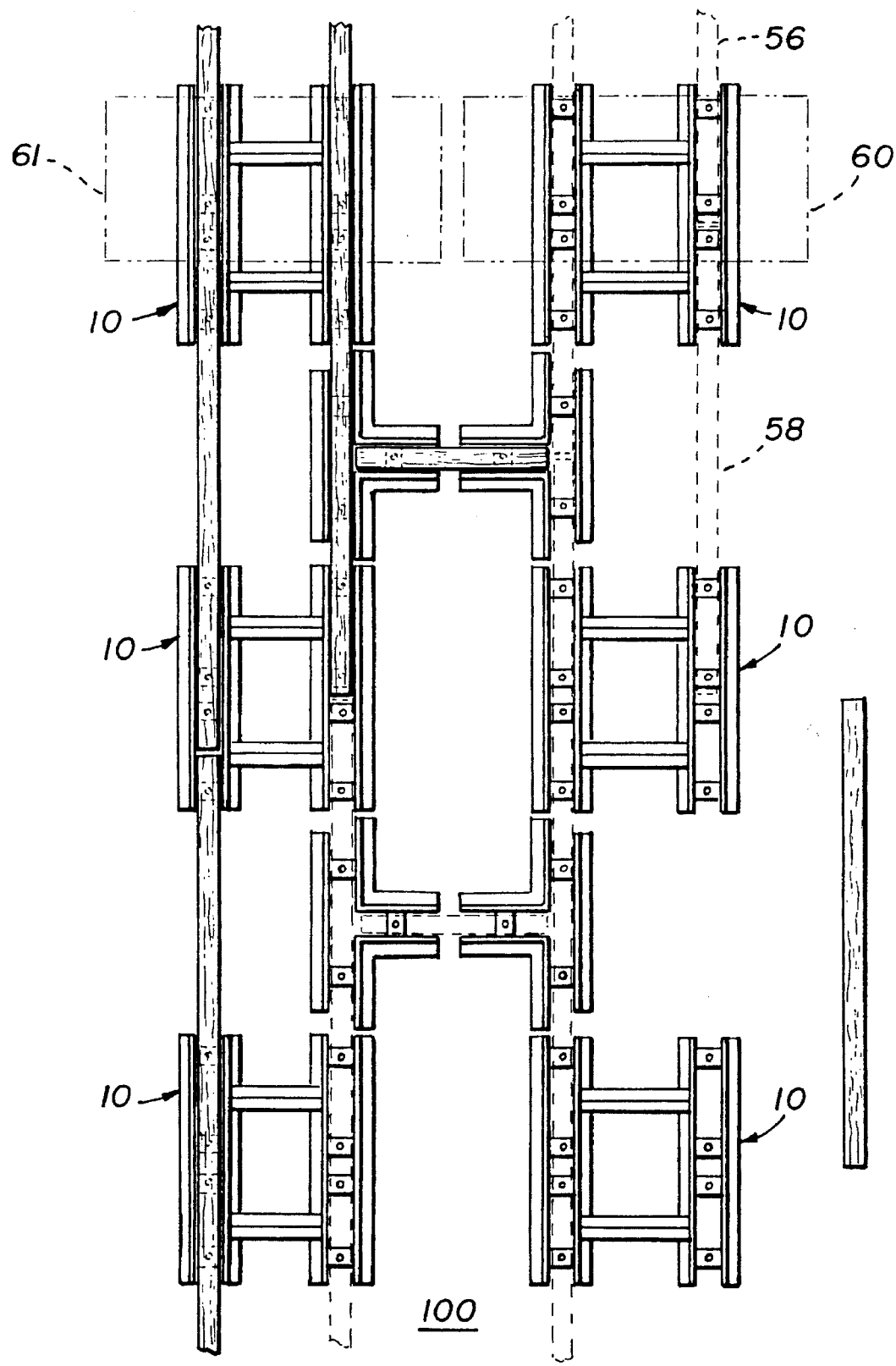
FIG. 5 is a top view of a set of rack forms of both the type shown in FIGS. 1–3 and of the type shown in FIG. 4, laid out to form two.

The application of this T-shaped rack form is best appreciated from FIG. 5, wherein a rack system 100 is depicted employing six H-racks 10 and four T-racks 90. That is, the T-racks 90 allow two parallel sets of racks 10 to be spaced apart (and kept apart by the timbers secured to both of them) so as to allow the storage of two rows of steel coils (such as the coils 60 and 61 shown in phantom outline) without damage of the coils contacting each other.

It should be noted that, when more than one timber is used in the system 100, the end-to-end position occurs within a trough or channel of a rack 10, so that both timbers are secured in place and the timbers also secure together the next rack form 10. It should also be noted that the timber may extend for a length between racks 10 and that such space can also be used for storing steel coils. That is, a pair of racks 10 joined by timbers can store considerably more coils than two single racks.

Although the system 100 is depicted in FIG. 5 with the T-racks 90 close to the racks 10 in practice, these may be spread further apart and a larger number of coils stored.

Experiments have shown that 16 feet of unchanneled timber can extend between racks 10.

Prototype racks of the general type as shown in the figures have been constructed and tested in actual steel coil storage use. While the inventor may well decide for reasons of economy or on the basis of further experimentation to modify future commercial versions, the presently anticipated best mode is depicted and described above. Likewise, the dimensions of the prototype hereafter listed may be modified in the future. With that in mind and with the caution to the reader to use competent engineering and mathematical tests to verify the following dimensions and to detect any possible typographical errors in their listing, the prototype of the rack 10 was about 40 inches in length, about 23-1/4 inches wide, and about 2 inches high (without a 4×4). The angles 16, 18, 36, 38, 50 and 52 were about two inches across their largest flat surface and about 1/8 inch in thickness. The plates 20, 22, 24, 26, 40, 42, 44 and 46 were about 3-5/8 inches in length, about 1/8 inch in thickness. In the prototype, 20p steel nails about 1-1/4 inch in length and about 3/16 inch in thickness were spot-welded to the plates, although, as shown in FIG. 1A, these spikes can be made by upsetting or punching upward a small section of the plate itself. The cross members 50, 52 were positioned at a right angle to the angles 36 and 18 and had their longest centerlines positioned about 10 inches from their respective ends of the assembly 10. The plates 46, 26, 20 and 40 were positioned with their centers about three inches from the ends of the troughs 12 and 14. The plates 42, 44, 24 and 22 were positioned with their centers about 4 inches from the center of the troughs 12 and 14.

The rack 90 had end plates sized and of the same common steel nature as were the plates and angles of the rack 10. The angle 74 was about 24 inches in length, the maximum length of angle 82, 80, 76 and 78 was about 12 inches and the plates about 3-5/8 inch by 2×1/8 inches in size.

While particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

As mentioned before, the length of 4×4s (or like) lumber units between the racks 10 can be made as large as about 16 feet. In some applications, it has been found desirable to place a straightener member between the timbers to keep them at the desired separation and prevent them bowing inward. Such a member may be an angle with vertical plates welded at its ends so that the entire member is about 12 inches in length.

It should now be apparent that a permanent system has been produced which can be changed to fit any needed size of coils over a wide range of coil sizes. Lumber in most cases can be used twice. However, with square cross sections, the lumber can be used as many as three times and possibly four, thereby resulting in lumber savings. Installation requires about one hour of unskilled labor per 500 feet. The quality of the steel is kept by keeping it off the floor and safety is achieved by preventing the coil from rolling.

What is claimed as the invention is:

1. A steel coil-receiving floor or ground rack device for use with at least two rectilinear cross-sectioned timbers, such as 4×4 lumber, for receiving a steel coil of a predetermined range of sizes and for resting on the floor or ground of a storage area, said device comprising, in combination:

first means for receiving and attaching in the received place one of the timbers in a generally horizontal array and such that the timber extends above said first means and presents a portion of the timber for receiving the coil;

second means for receiving and attaching in place a second of the timbers in a generally horizontal array and such that the timber extends above said second means and presents a portion of the timber for receiving the coil;

means affixed to and between said first and said second timber receiving means for defining the spatial relationship of said timbers such that the timbers are parallel to one another and spaced apart by a predetermined distance such that a predetermined sized steel coil can have its curved side surface on and between the timbers without the coil surface touching the floor or ground.

2. A steel coil-receiving floor or ground rack device for use with at least two rectilinear cross-sectioned timbers, such as 4×4 lumber, for receiving a steel coil of a predetermined range of sizes and for resting on the floor or ground of a storage area, said device comprising, in combination:

first means for receiving and attaching in the received place one of the timbers in a generally horizontal array and such that the timber extends above said first means and presents a portion of the timber for receiving the coil;

second means for receiving and attaching in place a second of the timbers in a generally horizontal array and such that the timber extends above said second means and presents a portion of the timber for receiving the coil;

means affixed to and between said first and said second timber receiving means for defining the spatial relationship of said timbers such that the timbers are parallel to one another and spaced apart by a predetermined distance such that a predetermined sized steel coil can have its curved side surface on and between the timbers without the coil surface touching the floor or ground, and wherein said first means defines a channel sized to closely receive the bottom portion of the one timber and said second means defines a channel sized to closely receive the bottom portion of the second timber.

3. A steel coil-receiving floor or ground rack device for use with at least two rectilinear cross-sectioned timbers, such as 4×4 lumber, for receiving a steel coil of a predetermined range of sizes and for resting on the floor or ground of a storage area, said device comprising, in combination:

first means for receiving and attaching in the received place one of the timbers in a generally horizontal array and such that the timber extends above said first means and presents a portion of the timber for receiving the coil;

second means for receiving and attaching in place a second of the timbers in a generally horizontal array and such that the timber extends above said second means and presents a portion of the timber for receiving the coil;

means affixed to and between said first and said second timber receiving means for defining the spatial relationship of said timbers such that the timbers are parallel to one another and spaced apart by a predetermined distance such that a predetermined sized steel coil can have its curved side surface on and between the timbers without the coil surface touching the floor or ground, and wherein said first means for receiving and attaching includes at least one spike that enters the one timber as it is received therein.

4. The rack device of claim 3 wherein said first means defines a channel sized to closely receive the bottom portion of the one timber and said second means defines a channel sized to closely receive the bottom portion of the second timber.

5. The rack device of claim 4 wherein said second means for receiving and attaching includes at least one spike that enters the second timber as it is received therein.

6. The rack device of claim 5 wherein a plurality of spikes are in each channel and two timbers may be joined end-to-end by placing them in a channel such that both are impaled by a spike.

7. The rack device of claim 6 wherein said channels have vertical sides and said spikes are mounted vertically between the sides of the channel such that a vertically descending timber is impaled on the spikes.

8. A floor rack assembly comprising at least two rack devices each constructed identically and as defined in, claim 2 which devices are spaced apart horizontally on a floor and aligned with each other with a first long timber having two ends positioned with one end in said first means of both said rack devices and a second long timber having two ends positioned with one end in said second means of both said rack devices, whereby a rack assembly for receiving steel coils is created which is much longer than the length of the two rack devices.

9. The invention of claim 8 wherein said channels of both rack devices include vertical spikes and first and second timbers are each impaled by said spikes of each of said both racks.

10. A floor rack for steel coils comprising: a pair of rectilinear cross section timbers a rack form for receiving the pair of timbers and aligning them in a parallel and spaced apart array at or on the floor such that a steel coil may be placed on top of and between the timbers, said rack form including means for restraining and captivating the timbers in place so that they are not free to move inwardly, outwardly or downwardly, and wherein said means for restraining and captivating includes spikes driven into the timbers as they are positioned in the rack form.

11. A floor rack for steel coils comprising: a pair of rectilinear cross section timbers a rack form for receiving the pair of timbers and aligning them in a parallel and spaced apart array at or on the floor such that a steel coil may be placed on top of and between the timbers, said rack form including means for restraining and captivating the timbers in place so that they are not free to move inwardly, outwardly or downwardly, and wherein said means for restraining and captivating includes means defining a pair of parallel first spaced-apart upwardly opening channels sized and shaped to receive the bottom of the rectilinear timbers and means joining and fixing the channel forming means together in a fixed array.

12. The floor rack of claim 10, wherein said means for restraining and captivating includes means defining a pair of parallel first spaced-apart upwardly opening channels sized and shaped to receive the bottom of the rectilinear timbers and means joining and fixing the channel forming means together in a fixed array.

13. The floor rack of claim 12 wherein said spikes are positioned vertically in said channels and the timbers are impaled thereon when they are forced into said channels.

14. A floor rack form comprising means defining a pair of horizontal upwardly opening channels at or just above the floor, said channels being sized for receiving the bottom of rectilinear cross-sectioned timbers, said channels including means for captivating timbers placed therein, which means resist the removal from the channels and resist the sliding of the timber in the channels.

15. The floor rack form of claim 14 wherein said pair of channels includes a main channel and a cross channel which opens into the main channel to form a T and a pair of such T rack forms may be used with a cross timber in them as channels to fix the horizontal spacing between the main channel of the pair of T rack forms.

16. The floor rack of claim 15 wherein said means for restraining and captivating includes spikes driven into the timbers as they are positioned in the rack form.

17. The floor rack of claim 14, wherein said means for restraining and captivating includes means defining a pair of parallel first spaced-apart upwardly opening channels sized and shaped to receive the bottom of the rectilinear timbers and means joining and fixing the channel forming means together in a fixed array.

* * * * *